Figure 1:
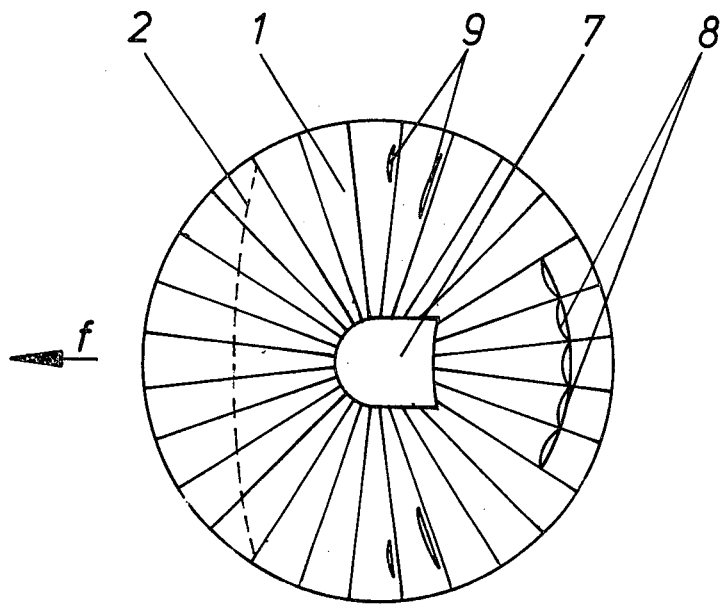

United States Patent [19]

Heinrich

[11] 4,078,744

[45] Mar. 14, 1978

[54] GLIDING PARACHUTE

[75] Inventor: Helmut G. Heinrich, Minneapolis, Minn.

[73] Assignee: Bruggemann & Brand KG, Wetter (Ruhr), Germany

[21] Appl. No.: 635,725

[22] Filed: Nov. 26, 1975

[30] Foreign Application Priority Data

Dec. 3, 1974  Germany ............................ 2457056

[51] Int. Cl.² ............................................. B64D 17/02
[52] U.S. Cl. .................................... 244/145; 244/152
[58] Field of Search .................. 244/138 R, 142, 145, 244/152

[56] References Cited

U.S. PATENT DOCUMENTS 3,690,603  9/1972  Lemoigne ............................ 244/145
3,958,780  5/1976  Matsuo et al. ....................... 244/152

FOREIGN PATENT DOCUMENTS 574,109  3/1924  France ................................ 244/145

Primary Examiner—Barry L. Kelmachter
Attorney, Agent, or Firm—Schuyler, Birch, Swindler, McKie & Beckett

[57] ABSTRACT

The invention relates to parachutes, particularly to a parachute which is able to descend at large glide angles relative to the vertical. The parachute has a vertical plane of symmetry when deployed, and is of simple, economic design and novel shape designed to adopt an aerofoil-like cross-section in its plane of symmetry. Slits are provided in the canopy to allow guidance by the parachutist, and a flow detector over the central canopy vent provides forward thrust and boundary layer control over the rear of the canopy. A dividing wall, transverse to the axis of symmetry of the canopy, forms an open chamber behind the leading edge of the canopy, which is filled with air at near stagnation pressure to prevent collapse of the leading edge at large glide angles.

20 Claims, 11 Drawing Figures a = 0,177 D
b = 0,162 D
c = 0,154 D
d = 0,033 D

GLIDING PARACHUTE

The present invention relates to a gliding parachute. The gliding characteristics of known parachutes of this type leave much to be desired, i.e. the glide angle relative to the vertical is relatively small in most constructions. Furthermore, their actual construction is extremely complicated, particularly if the attainable glide angle is larger than usual relative to the vertical. Thus, gores having the most varied configurations and made from numerous materials are used. Furthermore, it is usually necessary to provide a plurality of slits. These factors greatly increase production costs and reduce operating safety and reliability, particularly during the opening process.

The object of the invention is to provide a gliding parachute of simplified construction which brings about improved gliding characteristics together with adequate operating safety and reliability.

This problem is solved, according to the invention, by a gliding parachute the canopy of which, in its plane of symmetry located in the gliding direction; has a profile similar to an airfoil.

As a result of this feature, glide angles of about 60° and over, measured relative to the vertical, or 30° and under, measured relative to the horizontal, can be obtained. Furthermore, the canopy has a substantially closed form, largely comparable to the usual construction of a solid flat circular parachute. Thus, the gliding parachute can be manufactured almost as easily as the solid flat circular parachute. Relatively simple mass production is possible without difficulty.

It has been found that particularly advantageous gliding characteristics are obtained if the curved leading edge of the canopy forms a closed surface as in the case of an airfoil profile. Advantageously, the curvature at the leading edge is such that the lower edge of the canopy in the profile is clearly inclined inwards and downwards.

Preferably the canopy comprises two groups of gores, specifically a leading portion, whose gores are outwardly tapered in the region of their outer extremities, and a trailing portion whose gores are substantially triangular. When deployed and in gliding flight, the canopy glides in a direction such that the tapered gores of the leading section are at the front, and the triangular gores of the trailing portion are at the rear. Thus, the rear area of the canopy is comparable with that of a solid flat circular parachute and preferably forms an open trailing edge unlike the closed leading edge. Although the effects obtainable due to the above divergences from the normal solid flat circular parachute are very significant, they do not complicate manufacture, so that production can take place in advantageous manner.

The construction according to the invention at the same time greatly increases operating safety and reliability, because an excessively slotted, or even multipart, canopy construction is avoided, so that the requirements for troublefree opening are fulfilled.

To improve the shaping of the canopy, the gores of the leading portion can be subdivided into a furthest forward group, whose gores have a more pronounced taper at their outer extremities, and two lateral front groups, whose gores have a less pronounced taper. This admittedly increases the number of different gore types, but the increased manufacturing expenditure is more than outweighed by the improvements in the gliding characteristics obtained.

The same applies if the trailing portion is subdivided into two lateral rear groups, and into a furthest rearward group. The gores of the lateral rear groups are the furthest forward of the gores in the trailing section, and have narrow bases similar to the gores of a solid flat circular parachute, and the gores of the furthest rearward group have wider bases.

Advantageously, the permeability of the canopy material is less at the front than at the rear. Ideally, the permeability is zero at the leading edge. This feature leads to an extremely advantageous flow pattern at the leading edge and on the canopy top surface, in the sense of a flow all around the airfoil, i.e. the streamlines substantially follow the course of the canopy surface, and are only subject to turbulence well towards the rear. However, to maintain the porosity necessary for a favourable pressure distribution, and to minimise the opening shock, it is advantageous if the permeability increases stepwise from one group of gores to the next.

Particularly on reaching large glide angles relative to the vertical, there is a danger that the external pressure will cause the leading edge of the canopy to bulge inwards. Hitherto this phenomenon fixed the limits for the glide angles achievable with conventionally constructed parachutes; the maximum obtainable glide angle relative to the vertical is called the critical glide angle. The bulging inwards of the leading edge in fact changes the aerodynamic profile, leading to a considerable deterioration in the gliding characteristics. Furthermore, the bulges can periodically increase and decrease, leading to flapping of the individual gores with corresponding disadvantageous oscillations. According to a preferred feature, this danger is obviated in that in the front portion of the canopy a downwardly open stagnation chamber is formed by a substantially impermeable wall passing through the plane of symmetry of the canopy. A pressure builds up in this stagnation chamber, which, even in the case of extreme glide angles relative to the vertical, is substantially the same as the external pressure. Thus, the canopy shape is in particular stabilised at the front.

Put in a more precise manner, a pressure is produced in the downwardly-open stagnation chamber, which chamber is on the one hand defined by the leading edge of the canopy and on the other by the dividing wall, whereby this pressure approximately corresponds to the maximum external pressure at the stagnation point of the airfoil profile. As the stagnation chamber is preferably formed from impermeable cloth, no residual flow can escape through the stagnation chamber walls. Such a residual or seepage flow will in fact firstly cause a reduction of the pressure in the chamber causing a danger of bulging under extreme glide angles, and secondly a displacement and separation of the external airflow layers flowing along the canopy surface. The latter phenomenon would cause an undesirably early commencement of turbulence of the airflow layers, and therefore a deterioration of the aerodynamic characteristics of the canopy relative to the intended airfoil characteristics.

Otherwise, the flow pattern on the underside is approximately the same as that which occurs on the underside of a slightly inwardly curved airfoil.

In certain cases it can be advantageous not to sew and/or weld or stick (depending on the material) the internal wall which divides the stagnation chamber to the inside of the canopy continuously, but instead for example to only attach it in punctiform manner. For strength reasons this should take place at the points where the suspension lines, sometimes known as rigging lines, are sewn onto the canopy. In this case slits are formed which, during the opening shock, permit the passage of part of the airstream acting in shock-like manner on the opening stagnation chamber, thereby reducing the opening shock and the danger of tearing, or tearing away from the canopy, of parts of the wall. This embodiment would preferably be used, for example, for relatively high loads with a correspondingly large opening shock, bearing in mind that there would be a slight loss of pressure in the stagnation chamber during the gliding movement. For a similar reason, which is essential for freeing the said slits, it can also be advantageous to select a cloth or the like for the inner wall of the stagnation chamber which has a certain permeability, even if this is only small.

A central aperture, or vent, is provided in the canopy to stabilise the flow pattern above the canopy. In order to flatten the canopy profile in an aerodynamically advantageous manner, in conjunction with the stagnation chamber and the cut-arrangement and characteristics of the gores, a centre suspension line can be provided which is preferably about 15% longer than the canopy suspension lines. This centre line also contibutes to the stabilisation of the profile producing the lift, and can, if necessary, be lengthened or shortened to adapt the profile to particular flow states. Advantageously, the centre suspension line comprises a plurality of regularly arranged dome lines fixed to the edge of the vent, which come together at an interval below the vent, from where they continue as single or multi-part centre lines until they are fixed to the harness. A parachutist has the possibility of influencing the profile by further shortening the centre line by pulling on the latter.

A further improvement of the glide angle is obtained if a flow deflector is positioned above the vent which rearwardly directs the flow from the vent. This leads to a reduction in the boundary layer thickness, and an increase in the pressure on the top of the rear canopy portion. Furthermore, due to the momentum change in the air issuing from the vent, a jet reaction force is produced which contributes to the forward propulsion of the gliding parachute. It has been found that a rearward tunnel-like extension of the flow deflector beyond the direct vent area is advantageous.

A further increase in the forward thrust is obtained if transverse slits are provided in the rear canopy area. The airflow passes out from these transverse slits in a direction substantially parallel to the outer surface and increases and pressure acting on the outer surface of the canopy. The construction of the gores for this purpose according to the invention can best be gathered from the drawings referred to below.

On each side of the plane of symmetry, the canopy is preferably provided in a known manner with selectively-closable rearwardly-directed guiding slots. The arrangement is such that a maximum momentum is obtained with a minimum of open area. If the open areas are too large, there is a danger that, on opening, the canopy will not be reliably filled with sufficient air. If both guiding slots are opened, forward thrust is increased. Moreover, these slots allow the gliding parachute to be turned in any direction. Without these guiding slots, the gliding direction would be clearly defined and fixed by the shaping of the canopy.

Contrary to proposals made by others working in this field, the outer suspension lines are preferably of the same length, so that the opening process can take place smoothly whilst avoiding a crossing over of lines as well as other faults. However, the parachutist has the possibility of shortening the suspension lines at the front by pulling, so that the glide angle is changed relative to the vertical. However, the stagnation chamber wall suspension lines are preferably of different lengths, the lengths decreasing away from the plane of symmetry of the canopy. It is also possible to influence the glide angle considerably by providing the wall of the stagnation chamber with one or more slits which, during flight, can be selectively opened or closed.

Figure 2:
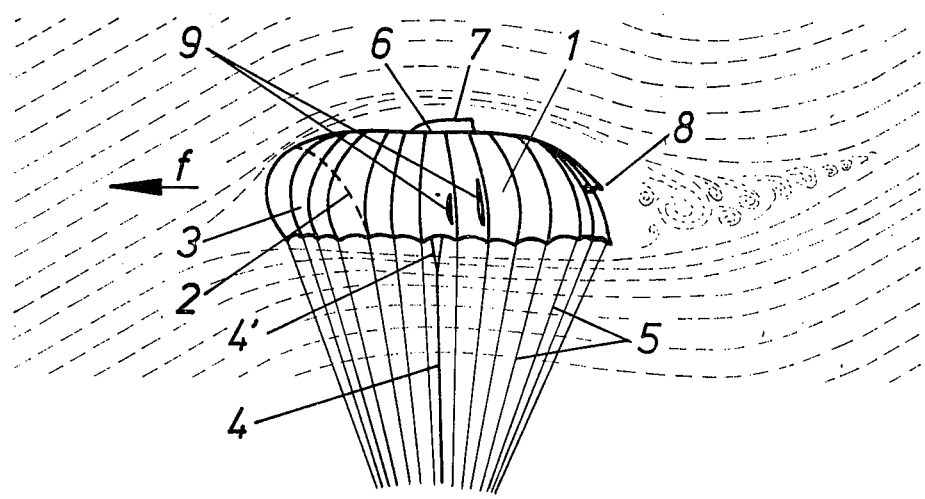
Figure 2A:
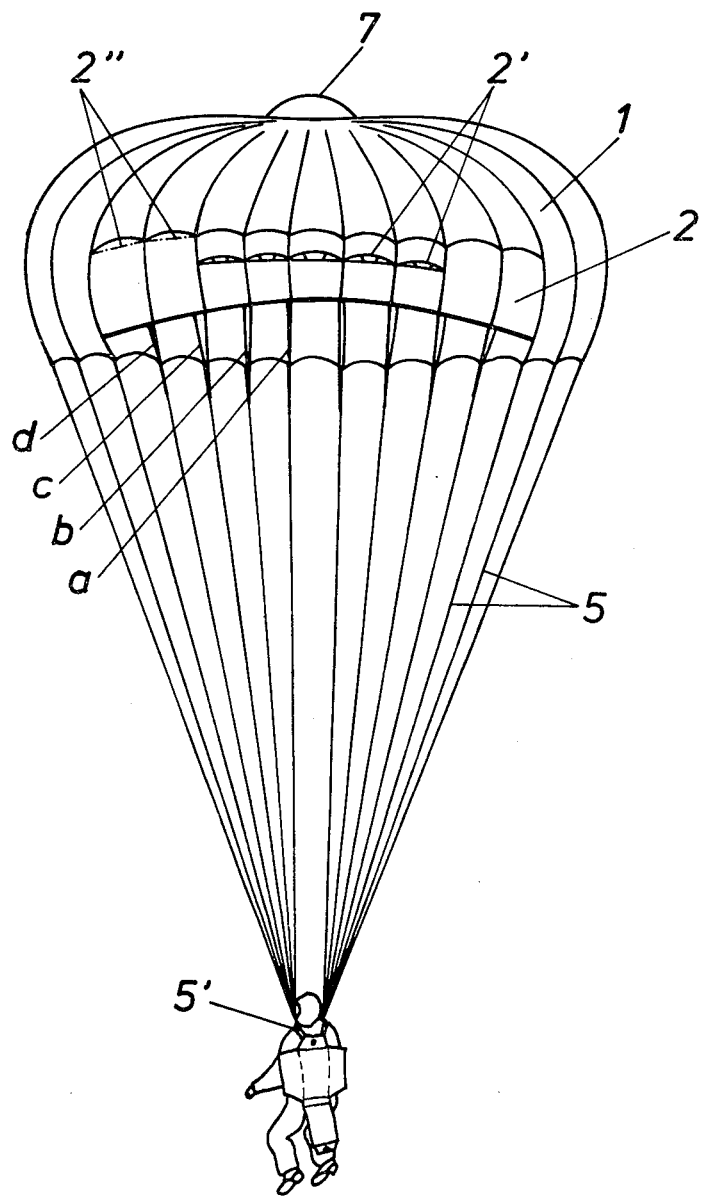
Figure 3:
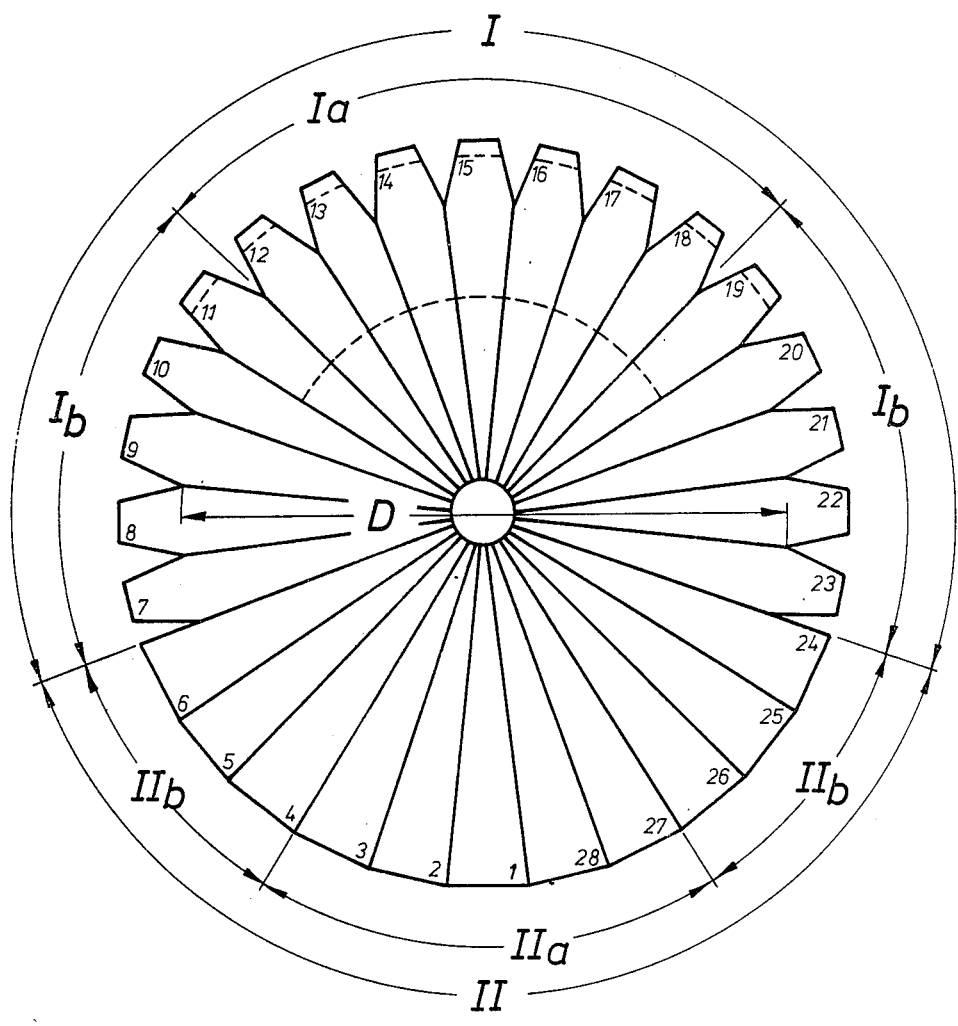
Figure 8:
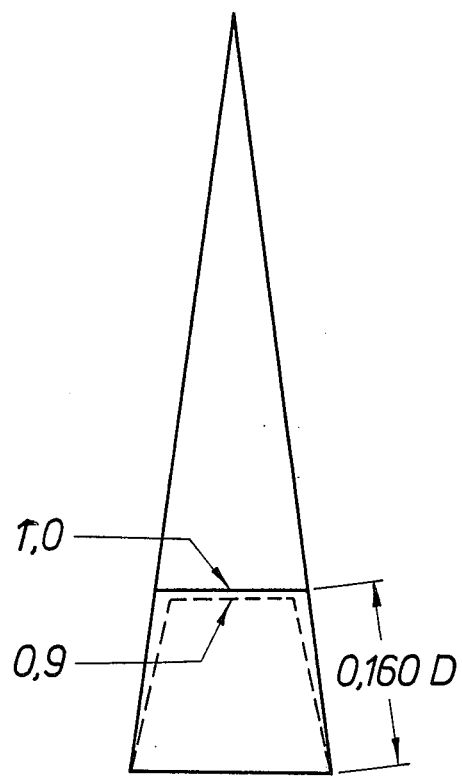
Figure 9:
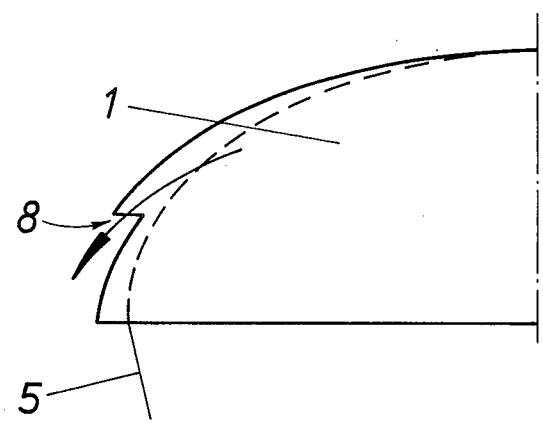
Figure 10:
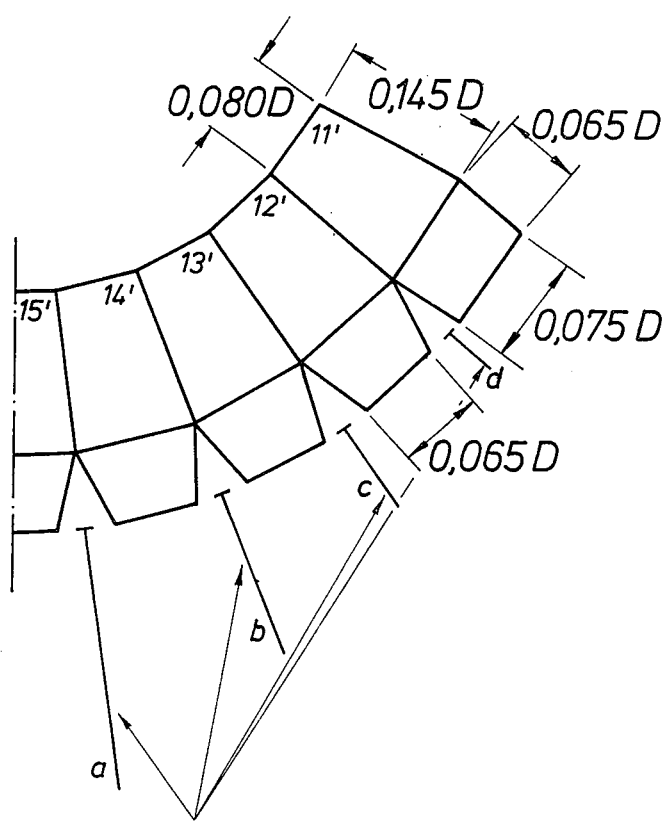

The invention is explained hereinafter in relation to a preferred embodiment with reference to the accompaying drawings, which show:

FIG. 1 a plan view of the gliding parachute with opened canopy;

FIG. 2 a side view of a practical embodiment in the wind tunnel with an indicated flow pattern;

FIG. 2a a rear view of a vertical cross section of the gliding parachute showing a stagnation chamber wall;

FIG. 3 a surface development of the canopy;

FIGS. 4 to 8 the gore types used according to FIG. 3;

FIG. 9 a bisected side view of the canopy, for representing the rear slits by means of gores according to FIG. 8; and, FIG. 10 the gore construction for a stagnation chamber inner wall, also in the form of a surface development corresponding to the canopy in FIG. 3.

As can be gathered from FIGS. 1 and 2, the gliding parachute according to the invention has a canopy 1 formed from gores in a substantially closed arrangement, outer suspension lines 5 of equal lengths and a harness 5' being attached to the canopy 1 by the suspension lines 5. In the deployed state, the canopy 1 has in its plane of symmetry a profile similar to a thick airfoil. The plane of symmetry defines the gliding direction of the gliding parachute, indicated in FIG. 2 by the arrow $f$. The represented flow pattern is essential to the invention and involves a flow all around the canopy 1, which is otherwise only characteristic of airfoils.

FIGS. 1, 2 and 2a show that in the leading portion of canopy 1 a wall 2 (shown by dotted lines in FIGS. 1 and 2), preferably made from an impermeable cloth or the like, intersects the plane of symmetry. This forms a downwardly-open stagnation chamber 3 in which builds up a pressure substantially corresponding to the external pressure. The lower edge of the wall 2 is held by a plurality of internal suspension lines $a, b, c$ and $d$ (shown in FIGS. 2a and 10), whose lengths decrease from the centre to the sides. The stagnation chamber wall 2 can be provided with closable slits 2'. Alternatively, slits 2" can be provided when the wall 2 is attached to the canopy at spaced locations along its upper edge.

A centre suspension line 4, which is about 15% longer than the outer suspension lines 5, serves to flatten the parachute profile. The centre line comprises a plurality of regularly arranged dome lines 4' attached to the edge of a vent 6, which converge at an interval below the vent at the beginning of the actual centre line 4.

A tunnel-shaped rearwardly extended and rearwardly opening flow deflector 7 is located over the vent 6 of canopy 1. It aids the gliding movement by producing a jet reaction force, by increasing the pressure at the back and by reducing the boundary layer thickness on the canopy 1.

In the rear area of the canopy 1, transverse slits 8 are provided (cf. also FIG. 9) which increase the pressure on the outer surface of the canopy 1 and increase forward thrust by the jet reaction force. Finally, the canopy 1 has guiding slots 9, which can be opened or closed at will. If both guiding slots 9 are opened, forward thrust is increased. Guiding slots of this type are normally located on both sides of the vent 6.

As shown in FIG. 3, the gliding parachute canopy 1 comprises individual gores 1 to 28, which are subdivided into two groups, the leading portion I and trailing portion II. Gores 7 to 23 of the leading portion are outwardly tapered in their outer areas and subsequently form the front of the canopy 1. However, gores 1 to 6 and 24 to 28 have a substantially triangular shape. It is stressed that from a manufacturing standpoint the triangular shape offers most advantages, however it is also possible to use gores formed stepwise from portions having a different lateral slope or curved shape.

The leading portion I is in turn subdivided into a furthest forward group of gores Ia and two groups Ib further aft. The two groups Ib comprise gores having the same shape, and these differ from the gores of subgroup Ia in that they are not quite so tapered in the outer area.

The trailing portion II is also subdivided into two groups of gores IIb and into a furthest rearward group IIa. The two groups IIb comprise identical gores, whose bases are narrower than the bases of the triangles of the gores in group IIa. The gores in subgroup IIb are comparable with those of a normal solid flat circular parachute.

Figure 4:
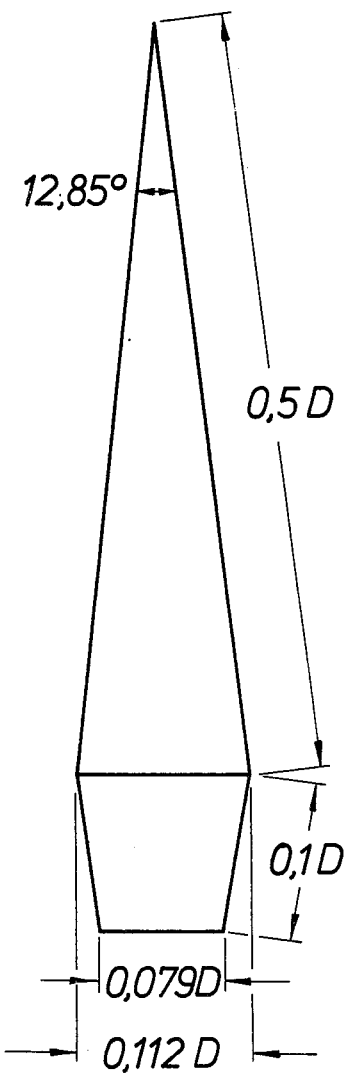
Figure 5:
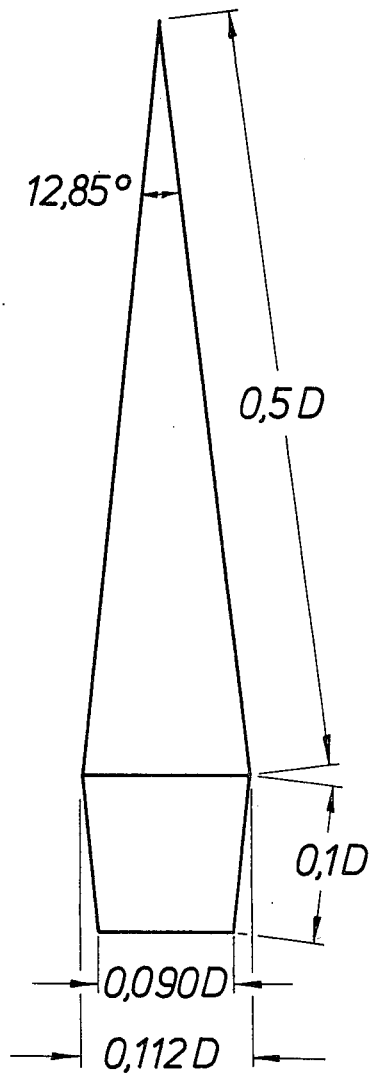
Figures 6, 7:
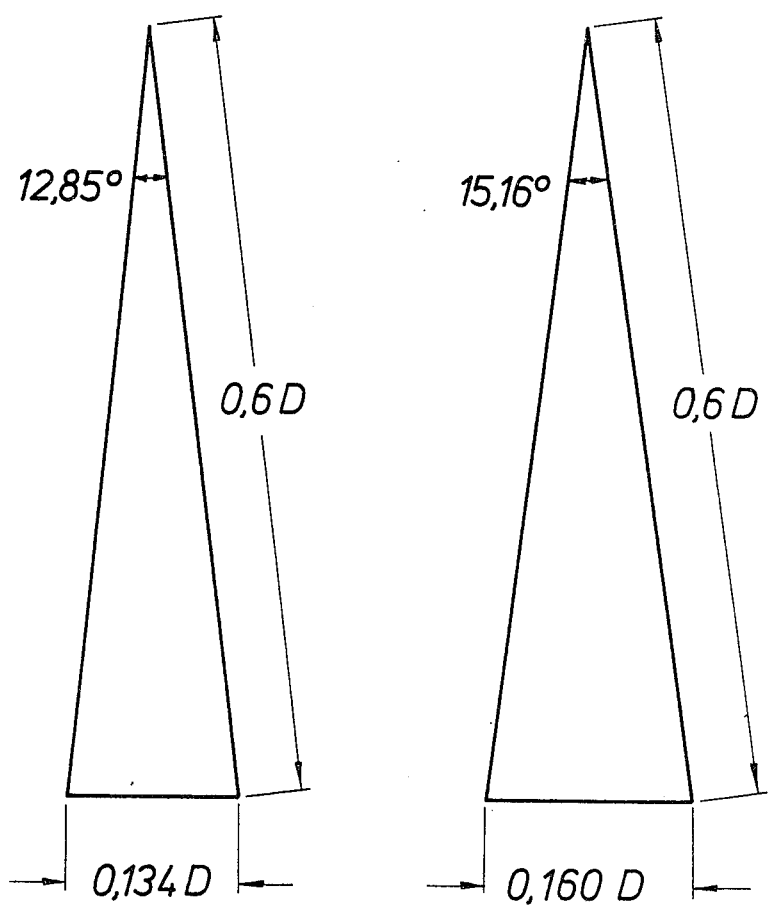

FIG. 4 shows a gore from subgroup Ia. The gore of FIG. 5 belongs to subgroup Ib. FIG. 6 shows a gore in subgroup IIb and finally FIG. 7 a gore in subgroup IIa.

FIG. 8 shows the gores in subgroup IIa which serve to form the transverse slits 8. Due to the narrower construction (c.f. the dimension 0.9 on the contours shown by dotted lines) of the outer portions, the transverse slits 8 are of the gable shape shown in FIGS. 2 and 9.

The gores in FIGS. 4 to 9 are made from different materials, i.e. from cloths having different aerodynamic porosity. The porosity increases from the gore shown in FIG. 4 to that shown in FIG. 9. This means that the finished canopy is substantially impermeable in the area near the leading edge, and most permeable in the rearmost area. In this way an optimum flow pattern above the canopy is obtained, close to that of a flow pattern of an airfoil with an advantageous late occurrence of turbulence. At the same time, the opening shock is reduced by the permeability present in the rear portions. The construction of the gores in subgroup IIa leads to a substantially open trailing edge of canopy 1.

FIGS. 4 to 9 contain further dimensions in the form of percentages relative to the value D. As can be seen, in FIG. 3 the diameter D is defined. Thus, e.g. the rear transverse slits 8 are at a distance of 0.160 D from the outer edge, whilst the stagnation chamber wall 2 is 0.2 D from the front outer edge. The appropriate permeability, or aerodynamic porosity, values for the gores shown in FIGS. 4 to 7 are respectively 0, 30, 100 ± 20 and 100 ± 20. If these values are at least approximately adhered to, a particularly advantageous construction according to the invention is obtained.

We claim:

1. A gliding parachute comprising a substantially circular canopy having a plurality of gores of parachute material emanating from the center of the canopy, a plurality of outer suspension lines, a harness attached to the periphery of the canopy by the suspension lines, said gores being constructed so that in sectional planes parallel to its vertical central plane located in the gliding direction said canopy defines lift-producing aerodynamic profiles of different configurations, the forward faces of the aerodynamic profiles facing the gliding direction being always closed and highly curved and in the lower portion thereof running substantially in the direction of the suspension lines attached thereto, and a wall of parachute material extending across the interior of the leading portion of the canopy and intersecting said central plane of the canopy to define with the interior of said forward faces of the aerodynamic profiles a downwardly open stagnation chamber.

2. A gliding parachute according to claim 1 wherein the aerodynamic profiles are less curved in their trailing portions than in their leading portions.

3. A gliding parachute according to claim 1 wherein said outer suspension lines have the same length when forming the aerodynamic profiles.

4. A gliding parachute according to claim 2 wherein said gores comprise a front group of gores tapered at their outer ends and a rear group of substantially triangular gores to form said aerodynamic profiles of the canopy.

5. A gliding parachute according to claim 4 wherein the front group of gores is subdivided into a furthest forward subgroup with gores having a greater taper and two lateral front subgroups having a lesser taper.

6. A gliding parachute according to claim 4 wherein the rear group of gores is subdivided into two lateral rear subgroups with a narrower base and a furthest aft subgroup with a wider base.

7. A gliding parachute according to claim 1 wherein the canopy material is characterized by a permeability to air which is less at the leading portion of the canopy than at the trailing portion thereof based on the gliding direction.

8. A gliding parachute according to claim 7 wherein the permeability to air increases in steps from one group of gores to the next and the permeability at the leading edge of the canopy is substantially zero.

9. A gliding parachute according to claim 1 further comprising a central suspension line which is about 15% longer than said outer suspension lines.

10. A gliding parachute according to claim 1 further comprising a plurality of inner suspension lines connected to said wall which become shorter from the center of said wall towards the sides.

11. A gliding parachute according to claim 1 wherein the surface of said wall has at least one closable slit.

12. A gliding parachute according to claim 1 wherein said wall is continuously joined to the inside of the canopy.

13. A gliding parachute according to claim 1 wherein said wall is joined to the inside of the canopy in punctiform manner to form slits.

14. A gliding parachute according to claim 1 wherein said canopy is made from a substantially impermeable fabric.

15. A gliding parachute according to claim 1 wherein said wall is slightly permeable to air.

16. In a gliding parachute comprising a substantially circular canopy having a plurality of gores of substantially equal length and of parachute material emanating from the center of the canopy to define a substantially uninterrupted canopy periphery, a harness, and a plurality of outer suspension lines connecting said harness to the periphery of said canopy, the improvement wherein a front group of said gores over at least a major portion of the front half of said canopy have tapered outer extremities connected contiguously together to define a leading face of said canopy in a gliding direction which is closed and highly curved and a rear group of said gores are substantially triangular with substantially untapered outer extremities connected contiguously together to define a trailing face of said canopy which has a lesser curvature than said leading face so that cross sections of said canopy taken in vertical planes parallel to the gliding direction have the general configuration of an airfoil when said canopy is inflated and said harness is hanging normally from said suspension lines without manipulation of the suspension lines by the parachutist.

17. A gliding parachute according to claim 16 further comprising a wall extending across the interior of said canopy transverse to the gliding direction and between the center of the canopy and said leading face to define a downwardly open stagnation chamber.

18. A gliding parachute according to claim 17 wherein said wall is made from a substantially impermeable fabric.

19. A gliding parachute according to claim 16 wherein said rear group of gores is divided into two lateral rear subgroups with a narrower base and a furthest aft subgroup with a wider base.

20. A gliding parachute according to claim 17 wherein said rear group of gores is divided into two lateral rear subgroups with a narrower base and a furthest aft subgroup with a wider base.

* * * * *